J. F. DANIELS & J. H. HUBBARD.
Wood Grinders.
No. 141,206.  Patented July 29, 1873.
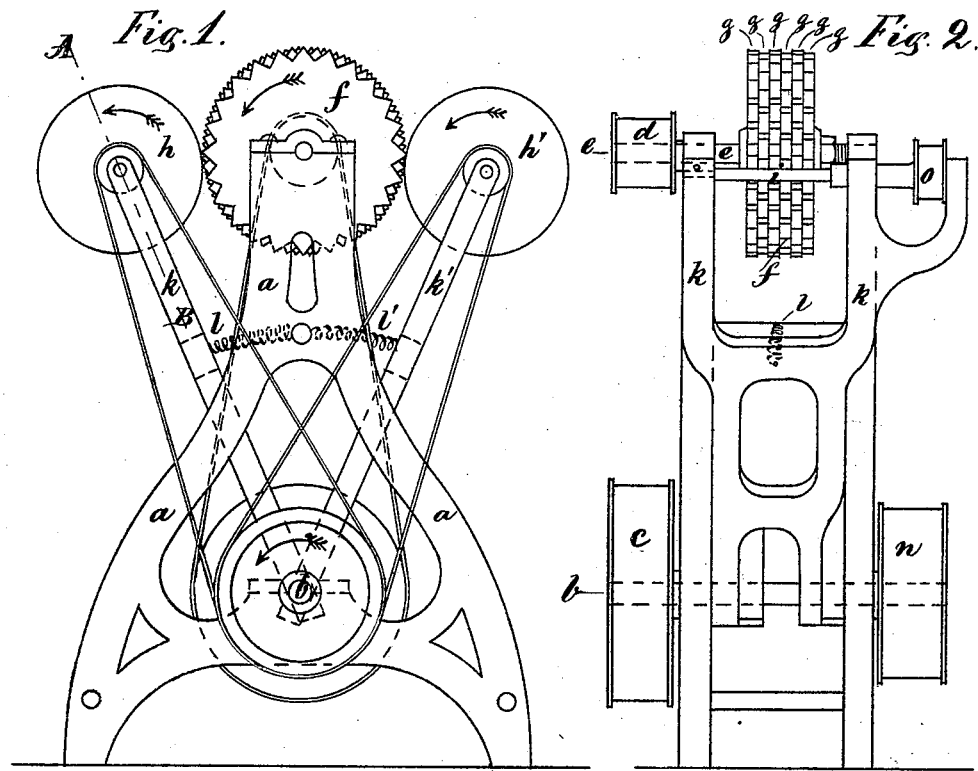
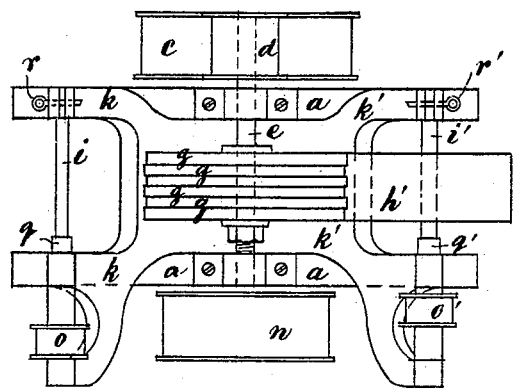
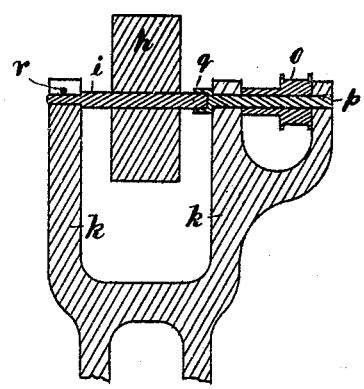
Witnesses:
E. Torrey
John R. Heard
Inventors:
John F. Daniels & J. H. Hubbard
by Alban Andrew atty.

UNITED STATES PATENT OFFICE.

JOHN F. DANIELS, OF BOSTON, MASSACHUSETTS, AND JOHN H. HUBBARD, OF STANSTEAD, CANADA.

IMPROVEMENT IN WOOD-GRINDERS.

Specification forming part of Letters Patent No. 141,206, dated July 29, 1873; application filed April 8, 1873.

*To all whom it may concern:*

Be it known that we, JOHN F. DANIELS, of Boston, county of Suffolk, State of Massachusetts, and JOHN H. HUBBARD, of Stanstead, Province of Quebec, Dominion of Canada, have jointly invented certain new and useful Improvements in Machines for Making Wood Fibers; and we do hereby declare the following to be a full, clear, and exact description of the invention, such as will enable others skilled in the art to which it pertains to make and use it, reference being had to the accompanying drawings, which form part of this specification.

Our invention relates to improvements in wood-grinders, to be used in the manufacture of paper, &c.; and consists in a revolving cylinder provided with cutting or tearing teeth on its circumference, against which the revolving wooden logs that are to be cut up into fibers are pressed by means of springs, weights, or their equivalents. The teeth on the circumference of the revolving cylinder are placed laterally in a zigzag position, so that the log is cut or torn by a continuation of lateral cutting-teeth, and not by the whole width of the cutting-cylinder at once. The length of the fibers can be regulated by the width of the cutting-disks of which the cutting-cylinder is composed.

On the drawing, Figure 1 represents a side view of the machine. Fig. 2 represents an end view seen from A on Fig. 1. Fig. 3 is a ground plan, and Fig. 4 represents a cross-section over the line A B on Fig. 1.

Similar letters refer to similar parts wherever they occur on the drawing.

$a\ a\ a$ is a suitable frame-work, provided in its lower end with bearings for the driving-shaft $b$, as shown. A pulley, $c$, is secured to one end of the shaft $b$, by means of which and a suitable belt the pulley $d$ is set in motion. The said pulley $d$ is secured to the spindle $e$ in the ordinary way. The cutting-cylinder $f$ is firmly secured to the spindle $e$ by means of keys or nuts, as may be practical. The cylinder $f$ is composed of a number of disks, $g\ g\ g$, each of which is provided with cutting-teeth around its circumference, as shown. The disks $g\ g\ g$ are secured to the spindle $e$ in such a manner that the teeth of one disk overlap the teeth of the next disk, and so on in succession, so that each disk tears away fibers from the log independently of its neighbor. We may make the teeth on the disks $g\ g\ g$ of any desired shape, such as flat, round, pointed, or otherwise, according to the nature of the wood that is to be made into fibers. $h\ h'$ represent the logs that are set in rotary motion on spindles $i\ i'$, in a direction as shown by arrows on Fig. 1, so that the circumferential motion of the logs shall be opposite to the circumferential motion of the cutting-cylinder $f$. The spindles $i\ i'$ are made to revolve in bearings in the upper ends of the movable frames $k\ k'$. The lower ends of the movable frames $k\ k'$ are hinged to the shaft $b$ or its equivalent. By means of the coiled springs $l\ l'$ attached to each of the movable frames $k\ k'$ and the stationary rod $m$, the revolving logs $h\ h'$ are kept in contact with the cylinder $f$.

We do not confine ourselves to the use of the coiled springs $l\ l'$, as we may to the same advantage use weights, screws, or their equivalents, as may be practical.

The spindles $i\ i'$ are set in motion by means of belts, cords, &c., leading from the pulley $n$ to the pulleys $o\ o'$, as shown in the drawings.

In Fig. 4 is shown the manner in which the logs are attached to the revolving spindles. $o$ on the said figure is the small pulley secured to the shaft $p$, that is provided on its inner end with a suitable clutch, $q$, having a polygonal recess, in which the end of the spindle $i$ is made to rest, as shown. The outer end of the spindle $i$ rests in a forked part of the frame $k$, as shown. A pin, $r$, is put through the frame $k$, above the spindle $i$, to keep said spindle in place during the operation of the machine. The log $h$ is driven firmly on the spindle $i$, in a usual manner. From this it will be seen that the spindle $i$ can easily be removed from the clutch $q$ simply by removing the pin $r$, when the spindle $i$ can be taken out from the frame $k$, and a new log placed on the said spindle as soon as a previous one is reduced to fibers.

The operation of our machine is as follows: The cylinder $f$ and the logs $h\ h'$, one or more, are set in motion, as shown in Fig. 1, when the action of the toothed disks $g\ g\ g$ commences tearing and splitting fibers from the circumference of the revolving logs $h\ h'$, that are pressed onto the cylinder $f$ by means of the coiled springs $l\ l'$ or their equivalents.

Having thus fully described the nature, construction, and operation of our invention, we wish to secure by Letters Patent, and claim—

1. A cutting-cylinder, $f$, composed of a number of cutting-disks, $g\ g\ g$, provided with cross-cut tearing-teeth on their circumferences, for the purpose of tearing off fibers, having pointed ends, as herein shown and described.

2. In combination with the cutting-cylinder $f$, as herein described, one or more revolving log-holders, made to rotate in movable frames $k\ k'$, as and for the purpose herein shown and described.

In testimony that we claim the foregoing we have hereunto set our hands this 2d day of April, 1873.

JOHN F. DANIELS.
JOHN H. HUBBARD.

Witnesses:
ALBAN ANDRÉN,
JOHN R. HEARD.